US012706776B2

(12) United States Patent
Wang et al.

(10) Patent No.: US 12,706,776 B2
(45) Date of Patent: Aug. 11, 2026

(54) POLLING SCHEME IN AN INDUSTRIAL NETWORK SYSTEM

(71) Applicant: Schneider Electric Industries SAS, Rueil Malmaison (FR)

(72) Inventors: Caijin Wang, Singapore (SG); Ashwani Singh, L'Isle d'Espagnac (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 263 days.

(21) Appl. No.: 18/378,707

(22) Filed: Oct. 11, 2023

(65) Prior Publication Data

US 2024/0137247 A1 Apr. 25, 2024
US 2024/0235888 A9 Jul. 11, 2024

(30) Foreign Application Priority Data

Oct. 24, 2022 (EP) .................................... 22306608

(51) Int. Cl.
*H04L 12/403* (2006.01)
*H04L 12/40* (2006.01)

(52) U.S. Cl.
CPC ...... *H04L 12/403* (2013.01); *H04L 12/40143* (2013.01)

(58) Field of Classification Search
CPC ............. H04L 12/40143; H04L 12/403; G06F 13/4291
See application file for complete search history.

(56) References Cited

U.S. PATENT DOCUMENTS 5,461,627 A * 10/1995 Rypinski ............... H04W 74/06 370/349
2002/0186662 A1 12/2002 Tomassetti et al.
(Continued)

OTHER PUBLICATIONS

UM10204 "I2C-bus specificaiton and user manual" Rev. 7.0; Oct. 1, 2021. (Year: 2021).*
(Continued)

*Primary Examiner* — Stephen J Clawson
(74) *Attorney, Agent, or Firm* — Wolf, Greenfield & Sacks, P.C.

(57) ABSTRACT

For polling communication devices in a communication system including a host device and communication devices. The host device is connected to the communication devices via a clock line for transmitting a clock signal to the communication devices and via an arbitration line implemented with "AND" logic for receiving arbitration signal transmitted by the communication devices. Each communication device is associated with an address. Each communication device is configured to pull up or down the arbitration line for sending an arbitration signal according to the associated address when the communication device is ready to send data to the host device. The host device is able to: send a clock signal on the clock line during an arbitration cycle, causing the communication devices to send respective arbitration signals towards the arbitration line according to respective associated addresses from highest bit to lowest bit, during the arbitration cycle, receive a final signal corresponding to the lowest address, during the arbitration cycle, resulting from the "AND" logic applied to the arbitration signals, select the communication device associated with the lowest address, and poll the selected communication device to receive data from the selected communication device during a communication cycle.

20 Claims, 3 Drawing Sheets

(56) References Cited

U.S. PATENT DOCUMENTS

| | | | | |
|---|---|---|---|---|
| 2004/0103232 | A1* | 5/2004 | Clayton | H04L 49/30 710/244 |
| 2007/0066359 | A1* | 3/2007 | Zhuang | H04W 72/1215 455/557 |
| 2010/0088537 | A1* | 4/2010 | Hua | H04L 12/4135 713/600 |
| 2011/0082955 | A1* | 4/2011 | Wortham | G06F 13/4256 710/110 |
| 2015/0095537 | A1 | 4/2015 | Sengoku | |
| 2019/0108149 | A1* | 4/2019 | Graif | G06F 13/4291 |
| 2019/0213165 | A1* | 7/2019 | Pitigoi-Aron | G06F 13/4291 |
| 2019/0286587 | A1 | 9/2019 | Mishra et al. | |
| 2020/0201804 | A1* | 6/2020 | Graif | G06F 13/4291 |
| 2021/0141757 | A1* | 5/2021 | Chakraborty | G06F 13/1673 |
| 2021/0216490 | A1* | 7/2021 | Kumar | G06F 13/4282 |

OTHER PUBLICATIONS

European Search Report and Search Opinion dated Mar. 29, 2023 for corresponding European Patent Application No. EP22306608.5, 7 pages.

* cited by examiner

POLLING SCHEME IN AN INDUSTRIAL NETWORK SYSTEM

CROSS-REFERENCE TO RELATED APPLICATIONS

This patent claims priority under 35 U.S.C. § 119 to European Patent Office (EPO) Application No. 22306608.5, filed on Oct. 24, 2022.

FIELD OF INVENTION

The present invention relates to network systems comprising communication devices controlled by a host device. In particular, it concerns a polling scheme of the communication devices for a communication with the host device.

BACKGROUND

In wired communication networks, there is a need to assign addresses to communication devices (or nodes) that are present/added in the network. This can be performed manually or automatically.

Such communication network may form a wireless gateway device managing different wireless modules as communication devices implementing mixed critical applications using various wireless radio protocols integrated in modular way within the same gateway device. These wireless modules can use with Zigbee, Bluetooth and IO Link Wireless based Industrial IoT (Internet of Things), Industrial control applications but can be used for other applications too.

In the traditional communication process, the host device first assigns a unique bus address to communication devices during initialization, for example addresses 1, 2, 3 and 4 assigned respectively to communication devices 1, 2, 3 and 4. Then the host device can broadcast a polling request frame with dedicated address information to get the data from wanted communication device. The host device first sends the polling request frame with address 1 to communication device 1. Although all the communication devices can receive this polling request frame as broadcast, only communication device 1 will reply after checking the address information in the polling request frame. The host device repeats the same process to get the data from each communication device 2, 3 and 4 one by one.

There are some disadvantages in the traditional polling scheme. First, the host device doesn't know the data status of the communication device, so it may waste time in polling some communication devices that don't have any data in this cycle. Secondly, this polling scheme treats all the communication devices equally. But in some applications, some communication devices' data are more critical than others and they need to be polled first.

There is therefore a need for an efficient polling scheme of communication devices in communication system for an industry 4.0 application.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for polling communication devices in a communication system comprising a host device and communication devices, wherein the host device is connected to the communication devices via a clock line for transmitting a clock signal to the communication devices and via an arbitration line implemented with "AND" logic for receiving arbitration signal transmitted by the communication devices, wherein each communication device is associated with an address, wherein each communication device is configured to pull up or down the arbitration line for sending an arbitration signal according to the associated address when said communication device is ready to send data to the host device, the method comprising the following steps:

- the host module sending a clock signal on the clock line during an arbitration cycle,
- the communication devices sending respective arbitration signals towards the arbitration line according to respective associated addresses from highest bit to lowest bit, during the arbitration cycle,
- the host module receiving a final signal corresponding to the lowest address, during the arbitration cycle, resulting from the "AND" logic applied to the arbitration signals,
- the host module selecting the communication device associated with the lowest address, host module polling the selected communication device to receive data from the selected communication device during a communication cycle.

Advantageously, the method allows to reduce communication latency for high priority communication and to increase the communication efficiency of low cost field bus.

The host device only polls communication devices that have data to send. Thus the host device can avoid wasting time in polling the communication devices without data to send. The host device polls the communication devices according to their priority. The communication devices with the highest priority can be served earlier so priority data are delivered to the system in priority.

In an embodiment, when a selected communication device has sent data to the host device, said selected communication device does not send arbitration signal during the next arbitration cycle.

In an embodiment, at each clock period of the clock signal, a communication device readbacks the value of the final signal, and if the readback value is different from the value of the arbitration signal sent by the communication device, said communication device stops sending arbitration signal during the arbitration cycle.

In an embodiment, the address associated with a communication device is defined according to a priority between the communication devices.

In an embodiment, the priority between the communication devices is based on the type of the communication devices.

In an embodiment, the communication device associated with an address with the lowest value has the highest priority.

In an embodiment, the priority between the communication devices is inversely linked to the value of the addresses of communication devices, the addresses with the lower values having the higher priority.

In an embodiment, the addresses respectively associated with the communication devices are incremented by one bit.

In an embodiment, at the end of timer, the host device communicates with the communication devices that have not been polled before.

In another implementation, there is provided a host device for polling communication devices in a communication system comprising the host device and communication devices, wherein the host device is connected to the communication devices via a clock line for transmitting an clock signal to the communication devices and via an arbitration line implemented with "AND" logic for receiving arbitration signal transmitted by the communication devices, wherein each communication device is associated with an address, wherein each communication device is configured to pull up or down the arbitration line for sending an arbitration signal according to the associated address when said communication device is ready to send data to the host device, the host device comprising:

- one or more network interfaces to communicate with the communication devices,
- a processor coupled to the network interfaces and configured to execute one or more processes; and
- a memory configured to store a process executable by the processor, the process when executed operable to:
- send a clock signal on the clock line during an arbitration cycle, causing the communication devices to send respective arbitration signals towards the arbitration line according to respective associated addresses from highest bit to lowest bit, during the arbitration cycle,
- receive a final signal corresponding to the lowest address, during the arbitration cycle, resulting from the "AND" logic applied to the arbitration signals,
- select the communication device associated with the lowest address,
- poll the selected communication device to receive data from the selected communication device during a communication cycle.

In another implementation there is provided a computer-readable medium having embodied thereon a computer program for executing a method for polling communication devices in an industrial network system comprising a host device and the communication devices. Said computer program comprises instructions which carry out steps according to the method according to the invention.

In another implementation there is provided a system comprising the host device and a plurality of communication devices connected to the host device.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
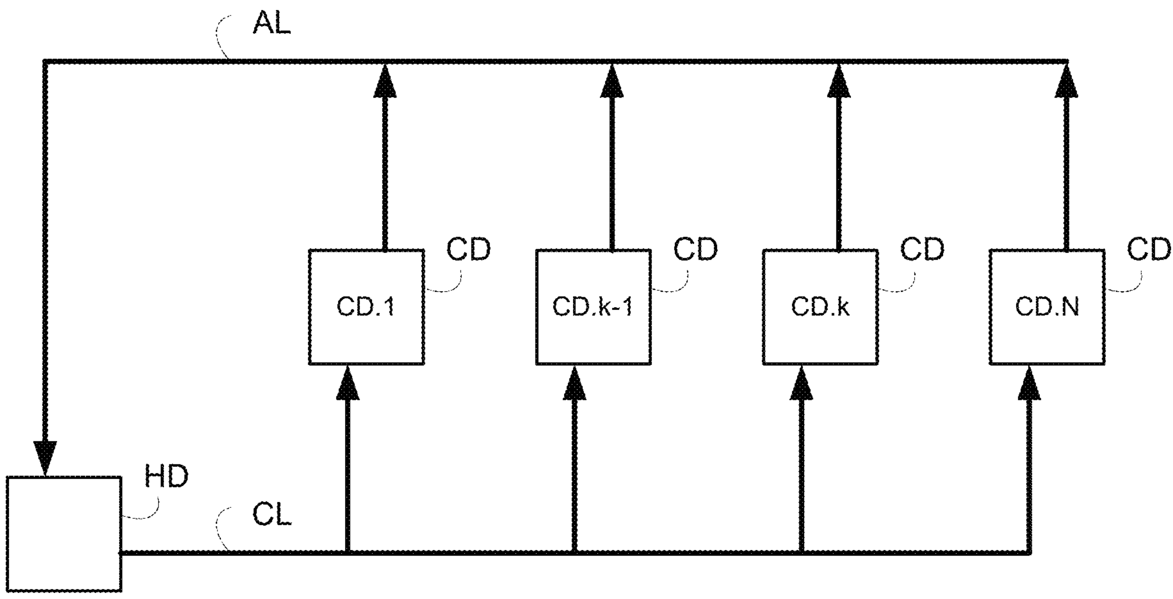
FIG. 1 shows a schematic block diagram of a communication system according to one embodiment of the invention for polling communication devices in an industrial network system.

Referring to FIG. 1, a communication system comprises a host device HD and communication devices CD. The communication devices CD form a plurality of N communication devices CD (CD.1, CD.k–1, CD.k, . . . CD.N), N being an integer greater than or equal to 2, and k being an index varying between 1 and N. Each communication device is indexed by an index greater than or equal to 1, the communication device of index 1 being connected to the master device.

The host device HD is connected to the communication devices CD in parallel via a clock line CL and via an arbitration line AL that form together a half-duplex field bus.

The clock line CL is a signaling unidirectional fieldbus line carrying a clock signal from the host device HD to the communication devices CD. If a communication device CD detects a clock signal from the commission line CL, the communication device CD enters in an arbitration state, during an arbitration cycle that lasts the time of the clock signal.

For example, the clock signal can be also a code signal or any signal including a specific pattern. If the clock signal is a specific frequency clock signal, a communication device will enter in an arbitration state only if it receives a signal from the clock line CL including such specific frequency clock.

The arbitration line CL is a signaling unidirectional fieldbus line carrying a data signal from the communication devices CD to the host device HD. The arbitration line CL is configured with an "AND" logic: if any communication device CD sends a logic zero, the logic value received by the host device is zero.

In one embodiment, a communication device CD can send a signal on the arbitration line CL by pulling up the voltage of the arbitration line for a "1" signal bit or by pulling down the voltage of the arbitration line for a "0" signal bit.

A communication device CD is a communication module using an application, dedicated sensors and a communication protocol. In one embodiment, the communication devices CD are radio modules using Zigbee, Bluetooth, WiFi and IO Link Wireless based Industrial IoT (Internet of Things). The host device HD and the communication devices CD form a wireless gateway device managing mixed critical application using various wireless protocol radio integrated in modular way within the same gateway device. In one embodiment for industrial application, the communication devices CD are arranged in a stacked-up manner upon the master device, forming a wireless gateway system under the form of a column.

In one embodiment, all the communication devices may have initially a common default address, such as 0XFE for example, and after an enrollment process may have a defined address on the arbitration line AL. In all cases, each communication device is indexed by an index k greater than or equal to 1 and is associated with an address Add_k.

In one embodiment, the address Add_k of communication device CD.k of index k is defined according to a priority between the communication devices. In one embodiment, the priority between the communication devices is based on the type of the communication devices.

The host device HD may store device information of the communication device of index k in the information table. The device information contains for example a name of the communication device of index k, an identifier of the communication device of index k, the address of the communication device of index k and a type of the communication device of index k. The identifier of the communication device can be a unique serial number that is saved into a memory of the communication device during production. The type of communication device can be a supporting function code that is saved into a memory of the communication device during production. The communication device with the same function or functions are designed to use the same type of communication device.

The address Add_k of communication device CD.k of index k with the lowest value is assumed to have the highest priority. The priority between the communication devices is linked and inversely proportional to the value of the addresses of communication devices. For example, one communication device's address is 1 and the other's is 0. The communication device with lower address value has higher priority, as explained hereinafter.

In an example system with a communication device CD.1 with an address Add_1 value equal to "1" and a communication device CD.2 with an address Add_2 value equal to "0", the communication device CD.2 has higher priority. When the host device wants to communicate with the communication devices CD.1, CD.2, the host device will start an arbitration first. To that end, the host device sends out a clock signal in the arbitration line. Because both communication devices CD.1, CD.2 have data to send, they join the arbitration and control the arbitration line's voltage according to their address values. The communication device CD.1 pulls up the arbitration line because its address is 1. But at the same time, the communication device CD.2 pulls down the arbitration line as its address value is 0. Because of the "AND" function in the arbitration line, the pulling up operation by the communication device CD.1 is failed, the final voltage value in the arbitration line is 0 and the communication device CD.2 wins the arbitration. The host device will then communicate with communication device CD.2 in a communication cycle following the arbitration cycle. During the communication cycle, the host device sends for example a request to the communication device CD.2 that then sends a reply to the host device.

In a general manner, if a communication device has data and detect a falling edge in the clock line, it will set the arbitration line's voltage to high or low according to its address value from highest bit to lowest bit. After setting the arbitration line, the communication device will readback the value (the voltage kept by the arbitration line). If the readback value is different from the setting value, which means there is another communication device with higher priority that wants to communicate with the host device, the communication device will stop arbitration.

During the arbitration cycle, the communication devices send their respective arbitration signals towards the arbitration line according to their respective associated addresses Add_k from highest bit to lowest bit, In another example system with a communication device CD.1 with an address Add_1 value equal to "0011b" and a communication device CD.2 with an address Add_2 value equal to "0111b", the communication device CD.1 has higher priority. At the first arbitration clock period, both communication devices set the arbitration line low according to their highest address bit, i.e. "0". At the second arbitration clock period, the communication device CD.2 detects the arbitration line's voltage value is different from what it wants to set: setting "1" whereas value is "0", so it stops arbitration. The communication device CD.1 wins the arbitration in this cycle and continues in the remaining cycles to set the arbitration line according to its address Add_1 value. Finally, the address that the host device gets is the address Add_1 of the communication device CD.1.

Figure 2:
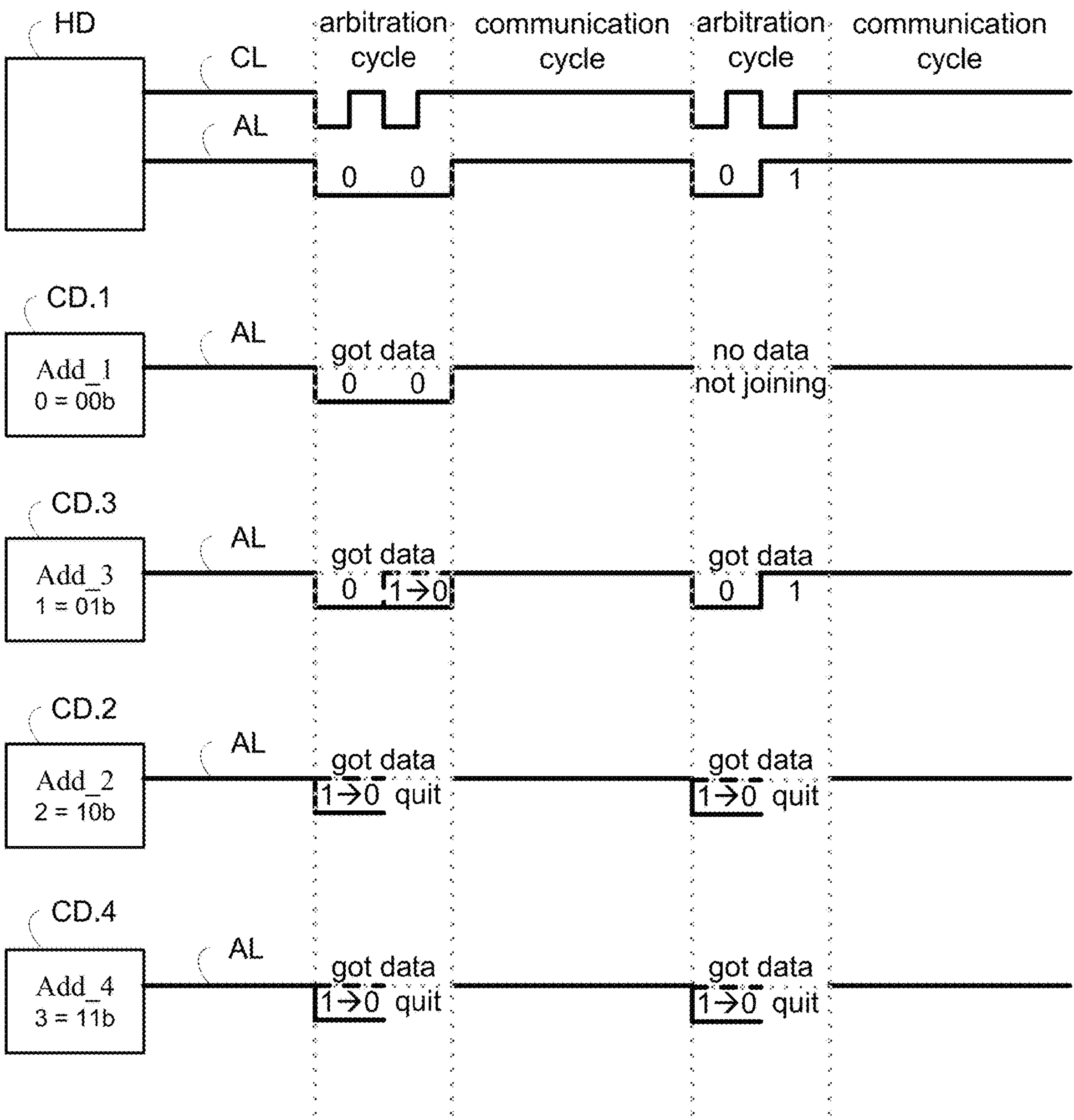
FIG. 2 shows a schematic block diagram illustrating a polling communication process with priority among communication devices.

Referring to FIG. 2, a polling communication process with priority is described. A communication system comprises a host device HD, a communication device CD.1 with an address Add_1 value equal to "00b", a communication device CD.2 with an address Add_2 value equal to "10b", a communication device CD.3 with an address Add_3 value equal to "01b" and a communication device CD.4 with an address Add_4 value equal to "11 b". The communication devices are placed according to priority based on their addresses.

During a first arbitration cycle, all communication devices join the arbitration process as they all have data to send. At the first arbitration clock period, communication devices CD.1 and CD.3 set the arbitration line low according to their highest address bit, i.e. "0", whereas communication devices CD.2 and CD.4 set the arbitration line high according to their highest address bit, i.e. "1". The communication device devices CD.2 and CD.4 detect the arbitration line's voltage value is different from what was setting: setting "1" whereas value is "0", so they stop arbitration and quit the process. At the second arbitration clock period, the communication device CD.1 wins the arbitration as the communication device CD.3 detects the arbitration line's voltage value is different from what was setting: setting "1" whereas value is "0 (for the lowest bit of its address). The host device selects the communication device CD.1 to communicate with it, by exchanging request and reply in a communication cycle following the arbitration cycle.

During a second arbitration cycle, all communication devices join the arbitration process as they all have data to send, except the communication device CD.1 that was previously selected. At the first arbitration clock period, the communication device CD.3 sets the arbitration line low according to its highest address bit, i.e. "0", whereas communication devices CD.2 and CD.4 set the arbitration line high according to their highest address bit, i.e. "1". Again, the communication device devices CD.2 and CD.4 lose arbitration, so they stop arbitration and quit the process. Thus the communication device CD.3 wins the arbitration because it has the highest priority (lowest address). The host device selects the communication device CD.3 to communicate with it, by exchanging request and reply in a communication cycle following the arbitration cycle.

An embodiment comprises a host device HD under the form of an apparatus comprising one or more processor(s), I/O interface(s), network interfaces, and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 3:
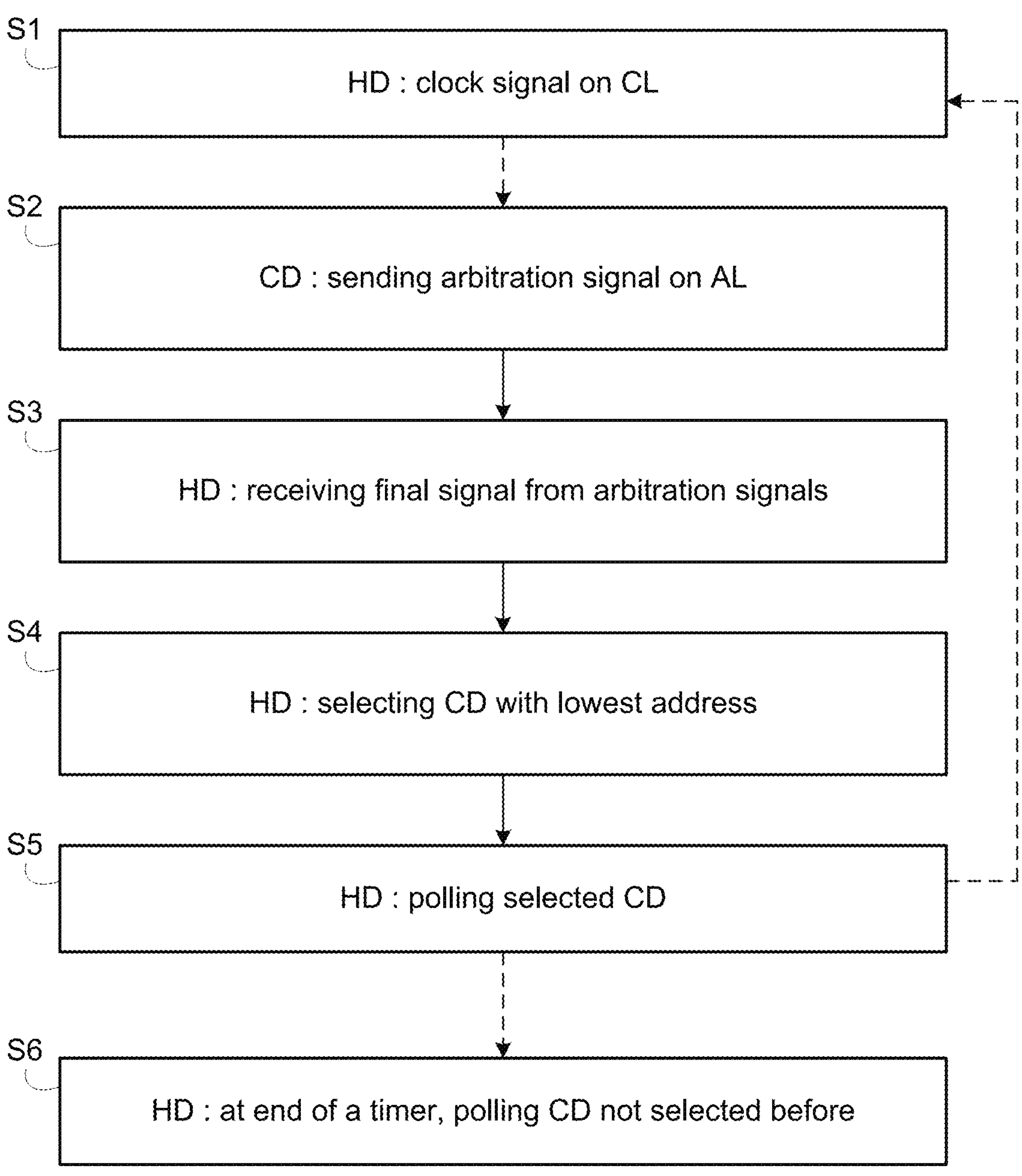
FIG. 3 shows a flow chart illustrating a method for polling communication devices in an industrial network system according to one embodiment of the invention.

With reference to FIG. 3, a method for polling communication devices in a communication system according to one embodiment of the invention comprises steps S1 to S6.

In step S1, the host module HD sends a clock signal on the clock line CL during an arbitration cycle.

In step S2, the communication devices CD send their respective arbitration signals towards the arbitration line AL according to respective associated addresses from highest bit to lowest bit.

In step S3, the host module HD receives a final signal corresponding to the lowest address, resulting from the "AND" logic applied to the arbitration signals.

In step S4, the host module HD selects the communication device associated with the lowest address.

In step S5, the host module HD polls the selected communication device to receive data from the selected communication device during a communication cycle.

In case a communication device cannot communicate with the host device due to its lower priority in comparison to other communication devices with higher priority, it is defined a timer called a starve cycle.

In step S6, when this timer times up, the host device HD communicates with the communication devices CD that have not been polled before, if any. After polling all those communication devices, the host device restores the normal arbitration process as in steps S1 to S6.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for polling communication devices in a communication system comprising a host device and the communication devices, wherein the host device is connected to the communication devices via a clock line for transmitting a clock signal to the communication devices and via an arbitration line implemented with "AND" logic for receiving arbitration signals transmitted by the communication devices, wherein each communication device is associated with an address, wherein each communication device is configured to pull up or down the arbitration line for sending an arbitration signal according to the associated address when the communication device is ready to send data to the host device, the method comprising:

the host device sending a clock signal on the clock line during an arbitration cycle;

the communication devices sending respective arbitration signals towards the arbitration line according to respective associated addresses from highest bit to lowest bit, during the arbitration cycle;

the host module device receiving a final signal corresponding to a lowest address of the associated addresses, during the arbitration cycle, resulting from the "AND" logic applied to the arbitration signals;

the host device selecting a communication device of the communication devices associated with the lowest address; and the host device polling the selected communication device to receive data from the selected communication device during a communication cycle.

2. The method according to claim 1, wherein when a selected communication device has sent data to the host device, the selected communication device does not send an arbitration signal during a next arbitration cycle.

3. The method according to claim 1, wherein at each clock period of the clock signal, a communication device readbacks a value of the final signal, and when the readback value is different from a value of the arbitration signal sent by the communication device, the communication device stops sending an arbitration signal during the arbitration cycle.

4. The method according to claim 1, wherein the address associated with a communication device is defined according to a priority between the communication devices.

5. The method according to claim 1, wherein a priority between the communication devices is based on a type of the communication devices.

6. The method according to claim 1, wherein a communication device of the communication devices associated with an address having a lowest value has a highest priority among the communication devices.

7. The method according to claim 1, wherein a priority between the communication devices is inversely linked to a value of the addresses of the communication devices, ones of the addresses with lower values having higher priority than other ones of the addresses with higher values.

8. The method according to claim 1, wherein the addresses respectively associated with the communication devices are incremented by one bit.

9. The method according to claim 1, wherein after an expiration of a timer, the host device communicates with the communication devices that have not been polled before.

10. A host device for polling communication devices in a communication system comprising the host device and the communication devices, wherein the host device is connected to the communication devices via a clock line for transmitting a clock signal to the communication devices and via an arbitration line implemented with "AND" logic for receiving arbitration signals transmitted by the communication devices, wherein each communication device is associated with an address, wherein each communication device is configured to pull up or down the arbitration line for sending an arbitration signal according to the associated address when the communication device is ready to send data to the host device, the host device comprising:

one or more network interfaces to communicate with the communication devices;

at least one memory configured to store processor-executable instructions; and at least one processor configured to execute the processor-executable instructions to:

send a clock signal on the clock line during an arbitration cycle, causing the communication devices to send respective arbitration signals towards the arbitration line according to respective associated addresses from highest bit to lowest bit, during the arbitration cycle;

receive a final signal corresponding to a lowest address of the associated addresses, during the arbitration cycle, resulting from the "AND" logic applied to the arbitration signals;

select a communication device of the communication devices associated with the lowest address; and poll the selected communication device to receive data from the selected communication device during a communication cycle.

11. The host device according to claim 10, wherein the address associated with a communication device is defined according to a priority between the communication devices.

12. The host device according to claim 10, wherein a priority between the communication devices is based on a type of the communication devices.

13. The host device according to claim 10, wherein the at least one processor is configured to execute the processor-executable instructions to determine that the communication device associated with an address having a lowest value has a highest priority among the communication devices.

14. The host device according to claim 10, wherein after an expiration of a timer, the at least one processor is configured to execute the processor-executable instructions to communicate with the communication devices that have not been polled before.

15. A non-transitory computer readable storage medium comprising instructions that, when executed by at least one processor, causes the at least one processor to perform a method for polling communication devices in a communication system comprising a host device and the communication devices, wherein the host device is connected to the communication devices via a clock line for transmitting a clock signal to the communication devices and via an arbitration line implemented with "AND" logic for receiving arbitration signals transmitted by the communication devices, wherein each communication device is associated with an address, wherein each communication device is configured to pull up or down the arbitration line for sending an arbitration signal according to the associated address when the communication device is ready to send data to the host device, the method comprising:

sending a clock signal on the clock line during an arbitration cycle, causing the communication devices to send respective arbitration signals towards the arbitration line according to respective associated addresses from highest bit to lowest bit, during the arbitration cycle, receiving a final signal corresponding to a lowest address of the associated addresses, during the arbitration cycle, resulting from the "AND" logic applied to the arbitration signals, selecting a communication device of the communication devices associated with the lowest address, and polling the selected communication device to receive data from the selected communication device during a communication cycle.

16. The non-transitory computer readable storage medium according to claim 15, wherein the address associated with a communication device is defined according to a priority between the communication devices.

17. The non-transitory computer readable storage medium according to claim 15, wherein a priority between the communication devices is based on a type of the communication devices.

18. The non-transitory computer readable storage medium according to claim 15, the method further comprising determining that the communication device associated with an address having a lowest value has a highest priority among the communication devices.

19. The non-transitory computer readable storage medium according to claim 15, wherein the addresses respectively associated with the communication devices are incremented by one bit.

20. The non-transitory computer readable storage medium according to claim 15, the method further comprising, after an expiration of a timer, causing the host device to communicate with the communication devices that have not been polled before.

* * * * *